(12) United States Patent
Suzuki

(10) Patent No.: US 12,460,286 B2
(45) Date of Patent: Nov. 4, 2025

(54) STEEL SHEET AND WELDED JOINT

(71) Applicant: NIPPON STEEL CORPORATION, Tokyo (JP)

(72) Inventor: Yuya Suzuki, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 18/273,453

(22) PCT Filed: Feb. 18, 2022

(86) PCT No.: PCT/JP2022/006706
§ 371 (c)(1),
(2) Date: Jul. 20, 2023

(87) PCT Pub. No.: WO2022/202020
PCT Pub. Date: Sep. 29, 2022

(65) Prior Publication Data
US 2024/0141467 A1 May 2, 2024

(30) Foreign Application Priority Data
Mar. 25, 2021 (JP) .................................. 2021-051017

(51) Int. Cl.
*B23K 11/11* (2006.01)
*C21D 1/18* (2006.01)
(Continued)

(52) U.S. Cl.
CPC .............. *C22C 38/60* (2013.01); *B23K 11/11* (2013.01); *C21D 1/18* (2013.01); *C21D 1/84* (2013.01);
(Continued)

(58) Field of Classification Search
None
See application file for complete search history.

(56) References Cited

U.S. PATENT DOCUMENTS

2008/0000555 A1 1/2008 Nonaka et al.
2014/0242416 A1 8/2014 Matsuda et al.
(Continued)

FOREIGN PATENT DOCUMENTS

EP 4 144 471 A1 3/2023
JP 6-128688 A 5/1994
(Continued)

OTHER PUBLICATIONS

U.S. Office Action for U.S. Appl. No. 18/274,364, dated Apr. 30, 2025.

*Primary Examiner* — Daniel J. Schleis
(74) *Attorney, Agent, or Firm* — Birch, Stewart, Kolasch & Birch, LLP

(57) ABSTRACT

This steel sheet has a predetermined chemical composition, and has, at a t/4-position which is a position at a distance of t/4 from the surface in a sheet thickness direction cross section when the sheet thickness is defined as t, a metal structure including 20% or more of ferrite and a total of 40% or more of bainite and martensite in volume fraction, the remaining portion being at least one selected from retained austenite and perlite. In a square-shaped area in which the length of one side is t/4 and which is centered at the t/4-position in the sheet thickness direction cross section, when the Mn concentration is measured at multiple measurement points located apart at a 1 μm-interval, the proportion of measurement points in which the Mn concentration is at least 1.1 times of the average value of the Mn concentration at all the measurement points is less than 10.0%. The steel sheet has a tensile strength of 980 MPa or more. The product between the tensile strength and the total elongation of the steel sheet is 10500 MPa·% or more.

8 Claims, 2 Drawing Sheets

(51) Int. Cl.
| | | |
|---|---|---|
| *C21D 1/84* | (2006.01) | |
| *C21D 6/00* | (2006.01) | |
| *C21D 8/02* | (2006.01) | |
| *C21D 9/46* | (2006.01) | |
| *C22C 38/00* | (2006.01) | |
| *C22C 38/02* | (2006.01) | |
| *C22C 38/04* | (2006.01) | |
| *C22C 38/06* | (2006.01) | |
| *C22C 38/08* | (2006.01) | |
| *C22C 38/10* | (2006.01) | |
| *C22C 38/12* | (2006.01) | |
| *C22C 38/14* | (2006.01) | |
| *C22C 38/16* | (2006.01) | |
| *C22C 38/20* | (2006.01) | |
| *C22C 38/22* | (2006.01) | |
| *C22C 38/26* | (2006.01) | |
| *C22C 38/28* | (2006.01) | |
| *C22C 38/30* | (2006.01) | |
| *C22C 38/32* | (2006.01) | |
| *C22C 38/34* | (2006.01) | |
| *C22C 38/38* | (2006.01) | |
| *C22C 38/44* | (2006.01) | |
| *C22C 38/46* | (2006.01) | |
| *C22C 38/48* | (2006.01) | |
| *C22C 38/50* | (2006.01) | |
| *C22C 38/52* | (2006.01) | |
| *C22C 38/54* | (2006.01) | |
| *C22C 38/58* | (2006.01) | |
| *C22C 38/60* | (2006.01) | |
| *C23C 2/28* | (2006.01) | |

(52) U.S. Cl.
CPC ............. *C21D 6/001* (2013.01); *C21D 6/002* (2013.01); *C21D 6/004* (2013.01); *C21D 6/005* (2013.01); *C21D 6/007* (2013.01); *C21D 6/008* (2013.01); *C21D 8/0205* (2013.01); *C21D 8/021* (2013.01); *C21D 8/0226* (2013.01); *C21D 8/0236* (2013.01); *C21D 8/0263* (2013.01); *C21D 8/0278* (2013.01); *C21D 9/46* (2013.01); *C22C 38/001* (2013.01); *C22C 38/002* (2013.01); *C22C 38/005* (2013.01); *C22C 38/008* (2013.01); *C22C 38/02* (2013.01); *C22C 38/04* (2013.01); *C22C 38/06* (2013.01); *C22C 38/08* (2013.01); *C22C 38/10* (2013.01); *C22C 38/12* (2013.01); *C22C 38/14* (2013.01); *C22C 38/16* (2013.01); *C22C 38/20* (2013.01); *C22C 38/22* (2013.01); *C22C 38/26* (2013.01); *C22C 38/28* (2013.01); *C22C 38/30* (2013.01); *C22C 38/32* (2013.01); *C22C 38/34* (2013.01); *C22C 38/38* (2013.01); *C22C 38/44* (2013.01); *C22C 38/46* (2013.01); *C22C 38/48* (2013.01); *C22C 38/50* (2013.01); *C22C 38/52* (2013.01); *C22C 38/54* (2013.01); *C22C 38/58* (2013.01); *C23C 2/285* (2013.01); *C21D 2211/001* (2013.01); *C21D 2211/002* (2013.01); *C21D 2211/005* (2013.01); *C21D 2211/008* (2013.01); *C21D 2211/009* (2013.01)

(56) References Cited

U.S. PATENT DOCUMENTS

| | | |
|---|---|---|
| 2015/0225821 A1 | 8/2015 | Hikida et al. |
| 2016/0010192 A1 | 1/2016 | Kitsuya et al. |
| 2019/0161822 A1* | 5/2019 | Takashima ............. C22C 38/08 |
| 2021/0140023 A1* | 5/2021 | Toji ........................ C22C 38/46 |

FOREIGN PATENT DOCUMENTS

| | | |
|---|---|---|
| JP | 4445365 B2 | 4/2010 |
| JP | 5305149 B2 | 10/2013 |
| WO | 2013/051238 A1 | 4/2013 |
| WO | WO 2021/261479 A1 | 12/2021 |

* cited by examiner

STEEL SHEET AND WELDED JOINT

TECHNICAL FIELD OF THE INVENTION

The present invention relates to a steel sheet and a welded joint.

Priority is claimed on Japanese Patent Application No. 2021-051017, filed on Mar. 25, 2021, the content of which is incorporated herein by reference.

RELATED ART

In recent years, improvement of vehicle fuel efficiency has been required from the viewpoint of control of greenhouse gas emissions associated with global warming countermeasures, and the application of high strength steel sheets has been further expanded to reduce the weight of vehicle bodies and secure collision safety. In particular, there has been recently an increasing need for high strength steel sheets having a tensile strength of 980 MPa or greater.

High strength steel sheets provided for vehicle components are required to have not only strength but also properties necessary for forming a component, such as press formability. As a property necessary for press formability, for example, ductility (elongation) is required. Therefore, there is an increasing need for steel sheets having a high strength and excellent ductility.

As a steel sheet which can obtain excellent ductility, a dual phase steel sheet (hereinafter, DP steel) composed mainly of a composite structure of soft ferrite and hard martensite has been known (for example, Patent Documents 1 and 2).

PRIOR ART DOCUMENT

Patent Document

[Patent Document 1] Japanese Unexamined Patent Application, First Publication No. H6-128688
[Patent Document 2] Japanese Patent No. 5305149

DISCLOSURE OF THE INVENTION

Problems to be Solved by the Invention

As described above, particularly recently, there has been an increasing need for high strength steel sheets having excellent formability in the application of high strength steel sheets in the field of vehicles. However, in recent years. DP steel having a tensile strength of 980 MPa or greater has a problem in that the strength of a welded joint when the steel is welded may be low.

Regarding such a problem, although DP steel is disclosed in Patent Documents 1 and 2, the welded joint strength is not taken into consideration. As above, there has been no proposal for a technology for improving the strength of a welded joint made from DP steel having a tensile strength of 980 MPa or greater.

An object of the present invention is to provide a steel sheet which has excellent formability and a tensile strength of 980 MPa or greater and can obtain a sufficient welded joint strength after welding, and a welded joint which is obtained from the steel sheet and can obtain a sufficient welded joint strength.

Means for Solving the Problem

The present inventors have conducted studies on the cause of a reduction in the strength of a welded joint when a DP steel having a tensile strength of 980 MPa or greater is welded. As a result, they have found that in a case where coarse martensite is present in a heat affected zone, residual stress is generated in a sheet thickness direction, and cracks easily occur therearound. In addition, the present inventors have conducted further studies, and as a result, found that it is effective to suppress Mn segregation in order to suppress the coarsening of prior $\gamma$ grains in a heat affected zone.

The present invention has been contrived in view of the above findings. The gist of the present invention is as follows.

[1] A steel sheet according to an aspect of the present invention containing, as a chemical composition, by mass %: C: 0.05% to 0.25%; Si: 0.05% to 2.00%; Mn: 1.50% to 3.00%; Al: 0.005% to 1.500%; P: 0% to 0.040%; S: 0% to 0.010%; N: 0% to 0.0100%; O: 0% to 0.0060%; Cr: 0% to 0.50%; Ni: 0% to 1.00%; Cu: 0% to 1.00%; Mo: 0% to 0.50%; Ti: 0% to 0.200%; Nb: 0% to 0.200%; V: 0% to 0.500%; B: 0% to 0.0100%; W: 0% to 0.1000%; Ta: 0% to 0.1000%; Sn: 0% to 0.0500%; Co: 0% to 0.5000%; Sb: 0% to 0.0500%; As: 0% to 0.0500%; Mg: 0% to 0.0500%; Ca: 0% to 0.0400%; Y: 0% to 0.0500%; La: 0% to 0.0500%; Ce: 0% to 0.0500%; Zr: 0% to 0.0500%; and a remainder: Fe and impurities, in which when a sheet thickness is denoted by t, a metallographic structure at a t/4-position, which is a position t/4 away from a surface, in a cross section in a sheet thickness direction includes, by volume percentage, ferrite: 20% or greater, bainite and martensite: 40% or greater in total, and a remainder consisting of one or more selected from residual austenite and pearlite, when the Mn concentration is measured at a plurality of measurement points at intervals of 1 μm in a square region with a side length of t/4 centered at the t/4-position in the cross section in the sheet thickness direction, a proportion of measurement points at which the Mn concentration is 1.1 times or greater an average of the Mn concentrations at all of the plurality of measurement points is less than 10.0%, the tensile strength is 980 MPa or greater, and the product of the tensile strength and the total elongation is 10,500 MPa·% or greater.

[2] In the steel sheet according to [1], the chemical composition may contain, by mass %, one or more selected from the group consisting of: Cr: 0.01% to 0.50%; Ni: 0.01% to 1.00%; Cu: 0.01% to 1.00%; Mo: 0.01% to 0.50%; Ti: 0.001% to 0.200%; Nb: 0.001% to 0.200%; V: 0.001% to 0.500%; B: 0.0001% to 0.0100%; W: 0.0005% to 0.1000%; Ta: 0.0005% to 0.1000%; Sn: 0.0010% to 0.0500%; Co: 0.0010% to 0.5000%; Sb: 0.0010% to 0.0500%; As: 0.0010% to 0.0500%; Mg: 0.0001% to 0.0500%; Ca: 0.0001% to 0.0400%; Y: 0.0001% to 0.0500%; La: 0.0001% to 0.0500%; Ce: 0.0001% to 0.0500%; and Zr: 0.0001% to 0.0500%.

[3] In the steel sheet according to [1] or [2], the steel sheet may have a hot-dip galvanized layer on the surface.

[4] In the steel sheet according to [3], the hot-dip galvanized layer may be a hot-dip galvannealed layer.

[5] A spot welded joint according to another aspect of the present invention containing, a base material portion; a nugget portion; and a heat affected zone, wherein the base material portion contains, as a chemical composition, by mass %, C: 0.05% to 0.25%, Si: 0.05% to 2.00%, Mn: 1.50% to 3.00%, Al: 0.005% to 1.500%, P: 0% to 0.040%, S: 0% to 0.010%, N: 0% to 0.0100%, O: 0% to 0.0060%, Cr: 0% to 0.50%, Ni: 0% to 1.00%, Cu: 0% to 1.00%, Mo: 0% to 0.50%, Ti: 0% to 0.200%, Nb: 0% to 0.200%, V: 0% to 0.500%, B: 0% to 0.0100%, W: 0% to 0.1000%, Ta: 0% to 0.1000%, Sn: 0% to 0.0500%, Co: 0% to 0.5000%, Sb: 0% to 0.0500%, As: 0% to 0.0500%, Mg: 0% to 0.0500%, Ca: 0% to 0.0400%, Y: 0% to 0.0500%, La: 0% to 0.0500%, Ce: 0% to 0.0500%, Zr: 0% to 0.0500%, and a remainder: Fe and impurities, and the maximum value of a prior $\gamma$ grain diameter in the heat affected zone is less than 30 μm.

Effects of the Invention

According to the above aspect of the present invention, it is possible to provide a steel sheet which has excellent formability and a tensile strength of 980 MPa or greater and can obtain a sufficient welded joint strength after welding, and a welded joint which is obtained from the steel sheet and can obtain a sufficient welded joint strength.

EMBODIMENTS OF THE INVENTION

Figure 1:
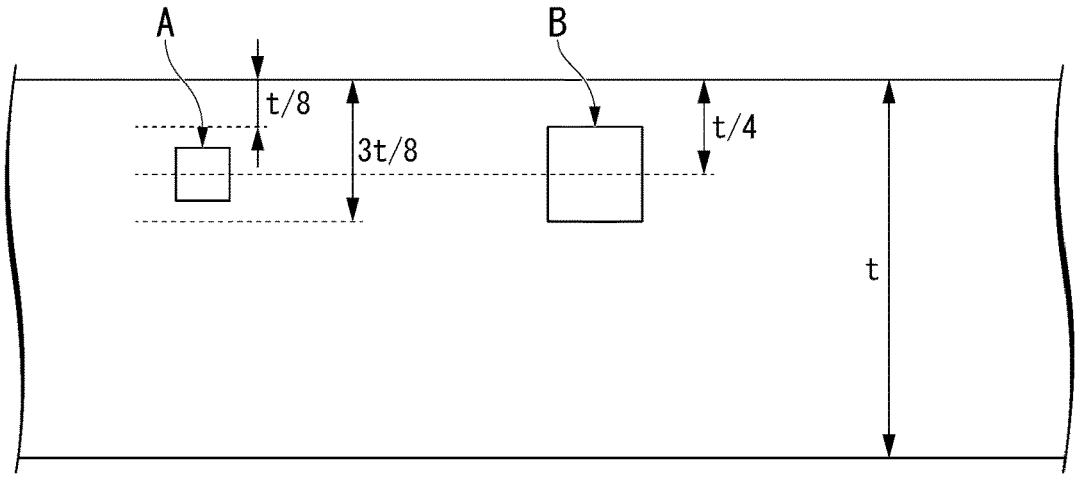
FIG. 1 is a diagram showing a region for structure observation and a region for Mn concentration measurement in a cross section in a sheet thickness direction.

A steel sheet according to one embodiment of the present invention (a steel sheet according to the present embodiment) has the following features: (a) the steel sheet has a predetermined chemical composition; (b) when a sheet thickness is denoted by t, a metallographic structure at a t/4-position, which is a position t/4 away from a surface, in a cross section in a sheet thickness direction includes, by volume percentage, ferrite: 20% or greater, bainite and martensite: 40% or greater in total, and a remainder consisting of one or more selected from residual austenite and pearlite; (c) when the Mn concentration is measured at a plurality of measurement points at intervals of 1 μm in a square region with a side length of t/4 centered at the t/4-position in the cross section in the sheet thickness direction, a proportion of measurement points at which the Mn concentration is 1.1 times or greater an average of the Mn concentrations at all of the plurality of measurement points is less than 10.0%; and (d) the tensile strength is 980 MPa or greater, and the product of the tensile strength and the total elongation is 10.500 MPa·% or greater.

In addition, a welded joint according to the present embodiment has the following features: (A) the welded joint has a predetermined chemical composition; and (B) the maximum value of a prior $\gamma$ grain diameter in a heat affected zone is less than 30 μm.

These will be described below.

1. Steel Sheet

First, a steel sheet according to the present embodiment will be described.

<Chemical Composition>

The chemical composition of the steel sheet according to the present embodiment will be described. Unless otherwise specified, the symbol % of each element's content represents mass %.

C: 0.05% to 0.25%

C (carbon) is an essential element for securing the strength of the steel sheet. In a case where the C content is 0.05% or greater, the desired high strength can be obtained. The C content may be 0.07% or greater or 0.08% or greater.

Meanwhile, in order to secure workability and weldability, the C content is set to 0.25% or less. The C content may be 0.23% or less, 0.22% or less, or 0.20% or less.

Si: 0.05% to 2.00%

Si (silicon) is an element which stabilizes ferrite. That is, since Si increases the Ac3 point (Ac3 transformation point), a large amount of ferrite can be formed in a wide annealing temperature range, and Si is contained from the viewpoint of improving the microstructure controllability of the steel sheet. In order to obtain such effects, the Si content is set to 0.05% or greater.

Meanwhile, in order to secure the weldability of the steel sheet, the Si content is set to 2.00% or less. The Si content may be 1.80% or less, 1.70% or less, or 1.50% or less.

Mn: 1.50% to 3.00%

Mn (manganese) is a strong austenite stabilization element, and is an effective element for increasing the strength of the steel sheet. In order to obtain these effects, the Mn content is set to 1.50% or greater. The Mn content may be 1.60% or greater or 1.70% or greater.

Meanwhile, in order to secure weldability and low temperature toughness, the Mn content is set to 3.00% or less. The Ma content may be 2.80% or less, 2.70% or less, or 2.50% or less.

Al: 0.005% to 1.500%

Al (aluminum) is an element which is used for deoxidation of steel. In order to obtain this effect, the Al content is set to 0.005% or greater.

Meanwhile, in a case where Al is excessively contained, the effect is saturated and the cost increases unnecessarily. Moreover, the transformation temperature of the steel increases and the load during hot rolling increases. Therefore, the Al content is set to 1.500% or less. The Al content is preferably 1.200% or less, 1.000% or less, or 0.800% or less.

P: 0% to 0.040%

P (phosphorus) is a solid solution strengthening element, and is an effective element for increasing the strength of the steel sheet. However, in a case where P is excessively contained, weldability and toughness are deteriorated. Therefore, the P content is set to 0.040% or less. The P content is preferably 0.035% or less, 0.030% or less, or 0.020% or less. The P content may be 0%, but the cost for dephosphorization increases in extremely reducing the P content. Therefore, the P content may be set to 0.001% or greater from the viewpoint of economic efficiency.

S: 0% to 0.010%

S (sulfur) is an element contained as an impurity, and is an element which forms MnS in steel and deteriorates toughness and hole expansibility. Therefore, the S content is set to 0.010% or less as a range in which toughness and hole expansibility do not significantly deteriorate. The S content is preferably 0.005% or less, 0.004% or less, or 0.003% or less. The S content may be 0%, but the cost for desulfurization increases in extremely reducing the S content. Therefore, the S content may be set to 0.0001% or greater from the viewpoint of economic efficiency.

N: 0% to 0.0100%

N (nitrogen) is an element contained as an impurity, and is an element which forms a coarse nitride in steel and deteriorates bendability and hole expansibility in a case where the content thereof is greater than 0.0100%. Therefore, the Ni content is set to 0.0100% or less. The N content is preferably 0.0080% or less, 0.0060% or less, or 0.0050% or less. The N content may be 0%, but the cost for denitrification increases in extremely reducing the N content. Therefore, the N content may be set to 0.00010% or greater from the viewpoint of economic efficiency.

O: 0% to 0.0060%

O (oxygen) is an element contained as an impurity, and is an element which forms a coarse oxide in steel and deteriorates bendability and hole expansibility in a case where the content thereof is greater than 0.0060%. Therefore, the O content is set to 0.0060% or less. The O content is preferably 0.0050% or less or 0.0040% or less. The O content may be 0%, but the O content may be set to 0.0001% or greater from the viewpoint of manufacturing cost.

The steel sheet according to the present embodiment contains, as a basic chemical composition, the above-described elements (basic elements) and the remainder consisting of Fe and impurities. Here, the "impurities" mean components which are mixed due to the raw materials such as ore and scrap and various factors in the manufacturing process in the industrial manufacturing of a steel sheet, and are permitted within a range not adversely affecting the present invention.

However, the steel sheet may contain the following elements (optional elements) instead of a part of Fe, if necessary. Since these elements are not necessarily contained, the lower limit of the content is 0%. In addition, the following elements may be mixed from scrap or the like as a raw material, but may be contained as impurities as long as the content thereof is equal to or less than an upper limit to be described later.

Cr: 0% to 0.50%
Ni: 0% to 1.00%
Cu: 0% to 1.00%

Cr (chromium), Ni (nickel), and Cu (copper) are all elements which contribute to the improvement of strength. Therefore, one or more selected from these elements may be contained as necessary. To obtain the above-described effect, the content of one or more selected from Cr, Ni, and Cu is preferably 0.01% or greater, and more preferably 0.10% or greater.

Meanwhile, in a case where the Cr content is greater than 0.50%, the Ni content is greater than 1.00%, or the Cu content is greater than 1.00%, there is a concern that the pickling property, the weldability, and the hot workability may be lowered. Therefore, the Cr content is set to 0.50% or less, the Ni content is set to 1.00% or less, and the Cu content is set to 1.00% or less. The Cr content may be 0.40% or less, 0.30% or less, or 0.10% or less. The Ni content may be 0.80% or less, 0.60% or less, or 0.20% or less. The Cu content may be 0.80% or less, 0.60% or less, or 0.20% or less.

Mo: 0% to 0.50%

Mo (molybdenum) is an element which increases the hardenability of steel and contributes to the improvement of strength as in the case of Mn. Therefore, Mo may be contained as necessary. To obtain the above-described effect, the Mo content is preferably 0.01% or greater, and preferably 0.10% or greater.

Meanwhile, in a case where the Mo content is greater than 0.50%, the hot workability is lowered, and there is a concern that the productivity may be lowered. Therefore, the Mo content is set to 0.50% or less. The Mo content is preferably 0.40% or less, 0.30% or less, or 0.10% or less.

Ti: 0% to 0.200%
Nb: 0% to 0.200%
V: 0% to 0.500%

Ti (titanium), Nb (niobium), and V (vanadium) are all elements which contribute to the improvement of the strength of the steel sheet by precipitation hardening, grain refinement strengthening by suppression of crystal grain growth, and dislocation strengthening through suppression of recrystallization. Therefore, one or more selected from these elements may be contained as necessary. To obtain the above-described effect, the steel sheet preferably contains at least one selected from 0.001% or greater of Ti, 0.0001% or greater of Nb. and 0.001% or greater of V.

Meanwhile, in a case where the Ti content is greater than 0.200%, the Nb content is greater than 0.200%, or the V content is greater than 0.500%, there is a concern that a coarse carbonitride may be precipitated and the formability may be lowered. Therefore, the Ti content is set to 0.200% or less, the Nb content is set to 0.200% or less, and the V content is set to 0.500% or less. The Ti content may be set to 0.180% or less, 0.150% or less, or 0.100% or less. The Nb content may be set to 0.180% or less, 0.150% or less, or 0.100% or less. The V content may be 0.400% or less, 0.300% or less, or 0.100% or less.

B: 0% to 0.0100%

B (boron) is an element which is segregated on the austenite grain boundary during welding, thereby strengthening the grain boundary, and contributing to the improvement of liquid metal embrittlement crack resistance. Therefore, B may be contained as necessary. To obtain the above-described effect, the B content is preferably 0.0001% or greater, and more preferably 0.0005% or greater or 0.0008% or greater.

Meanwhile, in a case where the B content is greater than 0.0100%, a carbide and a nitride are formed, the above-described effects are saturated, and the hot workability is lowered. Therefore, the B content is set to 0.0100% or less. The B content is preferably 0.0080% or less, 0.0050% or less, or 0.0030% or less.

W: 0% to 0.1000%
Ta: 0% to 0.1000%
Sn: 0% to 0.0500%
Co: 0% to 0.5000%
As: 0% to 0.0500%

W (tungsten), Ta (tantalum), Sn (tin), Co (cobalt), and As (arsenic) are elements which contribute to the improvement of the strength of the steel sheet by precipitation hardening and suppression of crystal grain coarsening. Therefore, these elements may be contained. In a case where the effects are obtained, the W content may be set to 0.0005% or greater, 0.0010% or greater, 0.0050% or greater, or 0.0100% or greater. The Ta content may be set to 0.0005% or greater, 0.0010% or greater, 0.0050% or greater, or 0.0100% or greater. The Sn content may be set to 0.0010% or greater, 0.0020% or greater, or 0.0050% or greater. The Co content may be set to 0.0010% or greater, 0.0100% or greater, or 0.0300% or greater. The As content may be set to 0.0010% or greater, 0.0020% or greater, or 0.0050% or greater.

Meanwhile, in a case where these elements are contained in a large amount, there is a concern that various characteristics of the steel sheet may be impaired. Therefore, the W content is set to 0.1000% or less, the Ta content is set to 0.1000% or less, the Sn content is set to 0.0500% or less, the Co content is set to 0.5000% or less, the Sb content is set to 0.0500% or less, and the As content is set to 0.0500% or less. The W content may be set to 0.0800% or less, 0.0500% or less, or 0.0300% or less. The Ta content may be set to 0.080% or less, 0.050% or less, or 0.0300% or less. The Sn content may be set to 0.0400% or less, 0.0300% or less, or 0.0100% or less. The Co content may be set to 0.4000% or less, 0.3000% or less, or 0.1000% or less. The As content may be set to 0.0400% or less, 0.0300% or less, or 0.0100% or less.

Mg: 0% to 0.0500%
Ca: 0% to 0.0400%
Y: 0% to 0.0500%
La: 0% to 0.0500%
Ce: 0% to 0.0500%
Zr: 0% to 0.0500%
Sb: 0% to 0.0500%

Ca (calcium), Mg (magnesium), Y (yttrium), La (lanthanum), Ce (cerium). Zr (zirconium), and Sb (antimony) are all elements which contribute to the improvement of formability. Therefore, one or more selected from these elements may be contained as necessary. To obtain the above-described effect, the content of one or more selected from Mg, Ca, Y, La, Ce, Zr, and Sb is more preferably 0.0001% or greater or 0.0010% or greater. The Sb content is more preferably 0.0020% or greater or 0.0050% or greater.

Meanwhile, in a case where the content of Mg. Y, La, Ce, Zr, or Sb is greater than 0.050% or the Ca content is greater than 0.040%, there is a concern that the pickling property, the weldability, and the hot workability may be lowered. Therefore, the Mg content, the Y content, the La content, the Ce content, the Zr content, and the Sb content are all set to 0.0500% or less, and the Ca content is set to 0.0400% or less. Each of the Mg content, the Ca content, the Y content, the La content, the Ce content, the Zr content, and the Sb content is preferably 0.0350% or less, 0.0300% or less, or 0.0100% or less.

As described above, the steel sheet according to the present embodiment contains, as a chemical composition, basic elements and the remainder consisting of Fe and impurities, or basic elements, further one or more optional elements, and the remainder consisting of Fe and impurities.

<When Sheet Thickness is Denoted by t, Metallographic Structure at t/4-Position Which is Position t/4 Away from Surface in Cross Section in Sheet Thickness Direction>

[Ferrite: 20 Vol % or Greater]

Ferrite has excellent ductility, but has a soft structure. In order to secure the elongation of the steel sheet, the volume percentage of ferrite is set to 20% or greater.

Meanwhile, in a case where the volume percentage of ferrite is excessive, it is difficult to secure the desired strength of the steel sheet. Therefore, the volume percentage of ferrite is set to 60% or less. The volume percentage of ferrite may be 50% or less.

[Bainite and Martensite: 40 Vol % or Greater in Total]

In order to improve the strength, the total volume percentage of bainite and martensite is set to 40% or greater. As long as this requirement is satisfied, the volume percentages of martensite and bainite need not be specified individually, but the tempered martensite content may be 10% or greater, 15% or greater, or 20% or greater by volume percentage.

The volume percentage of bainite and martensite is set to 80% or less in order to secure 20% or greater of ferrite.

In the steel sheet according to the present embodiment, martensite includes fresh martensite and tempered martensite.

[Remainder: One or More Selected from Residual Austenite and Pearlite]

As the remainder other than ferrite, bainite, and martensite, one or more selected from residual austenite and pearlite may be contained. The volume percentage of the remainder is, for example, 10% or less or 5% or less. The volume percentage of the remainder may be 0%.

The volume percentage of martensite at a t/4-position is obtained by the following procedure.

An observation surface of a sample is etched with a LePera liquid. Within a range of ⅛ to ⅜ of the sheet thickness from the surface, centered at a position ¼ of the sheet thickness away from the surface in a cross section in a sheet thickness direction as shown by A in FIG. 1, a region of 100 μm×100 μm is observed at a magnification of 3,000-fold using FE-SEM. In LePera corrosion, martensite and residual austenite are not corroded. Therefore, the area ratio of the uncorroded region is the total area ratio of martensite and residual austenite. In addition, in the present embodiment, the total area ratio of martensite and residual austenite is regarded as the total volume percentage of martensite and residual austenite. The volume percentage of martensite is calculated by subtracting the volume percentage of residual austenite measured by a method to be described later from the area ratio (that is, volume percentage) of the uncorroded region.

The volume percentage of residual austenite can be calculated by measurement using an X-ray diffractometer. In the measurement using an X-ray diffractometer, first, a region from a sheet surface (rolled surface) of a sample to a surface at a depth of ¼ of the sheet thickness is removed by mechanical polishing and chemical polishing. Next, in the surface at a depth of ¼ of the sheet thickness t, the integrated intensity ratios of the diffraction peaks of (200) and (211) of the bcc phase and (200), (220), and (311) of the fcc phase are obtained using MoKα rays as characteristic X-rays, and based on the integrated intensity ratios, the volume percentage of residual austenite can be calculated.

The volume percentages of ferrite, bainite, and pearlite at the t/4-position are obtained by the following procedure.

An observation surface of a sample is etched with a LePera liquid. Within a range of ⅛ to ⅜ of the sheet thickness from the surface, centered at a position ¼ of the sheet thickness away from the surface in a cross section in a sheet thickness direction as shown by A in FIG. 1, a region of 100 μm×100 μm is observed at a magnification of 3,000-fold using FE-SEM. A region containing no cementite in the crystal is determined as ferrite, a region containing cementite in the crystal in which the cementite is arranged in a lamellar shape is determined as pearlite, and a region containing cementite in the crystal and having a plurality of variants of cementite is determined as bainite. Then, the area ratios thereof are obtained by a point-counting method (according to ASTM E562). Assuming that the area ratio and the volume percentage are the same, the obtained area ratio of each structure is defined as the volume ratio.

<When Mn Concentration is Measured at Plurality of Measurement Points at Intervals of 1 μm in Square Region with Side Length of t/4 Centered at t/4-Position in Cross Section in Sheet Thickness Direction. Proportion of Measurement Points at which Mn Concentration is 1.1 Times or Greater Average of Mn Concentrations at Plurality of Measurement Points (all Measurement Points): Less than 10.0%>

As described above, in a case where coarse residual austenite or fresh martensite is present in a heat affected zone, these act as the origin of cracks and cracks easily occur.

In order to suppress such cracks, refinement of residual austenite (γ) is effective. Since coarse residual γ is generated in the Mn segregation portion, it is effective to suppress Mn segregation.

Specifically, when the Mn concentration is measured at a plurality of measurement points at intervals of 1 μm using an electron probe microanalyzer (EPMA) in a square region with a side length of t/4 centered at a t/4-position in a cross section in a sheet thickness direction as shown by B in FIG. 1, a proportion (number proportion) of measurement points at which the Mn concentration is 1.1 times or greater (1.1 or greater when an average is 1.0) an average of the Mn concentrations at all the measurement points (the plurality of measurement points) is required to be less than 10.0%. That is, when "concentration at each measurement point/average concentration at all measurement points in measurement region" is defined as a segregation degree, a proportion of the measurement points at which the segregation degree is 1.1 or greater is required to be less than 10.0%.

<Mechanical Properties>

The tensile strength of the steel sheet according to the present embodiment is set to 980 MPa or greater in consideration of contribution to the weight reduction of a vehicle body. In addition, in the steel sheet according to the present embodiment, tensile strength×total elongation (TS×tEl) is set to 10,500 MPa·% or greater.

The tensile strength (TS) and the total elongation (tEl) are obtained by performing a tensile test according to JIS Z 2241: 2011 with a JIS No. 5 tensile test piece collected from the steel sheet in a direction perpendicular to the rolling direction.

[Plating Layer]

The above-described steel sheet according to the present embodiment may have a hot-dip galvanized layer on the surface thereof. Due to the hot-dip galvanized layer present on the surface, corrosion resistance is improved.

For example, in a case where the steel sheet is used under an environment where it corrodes, it is concerned that perforation or the like may occur, and thus it may not be possible to reduce the thickness to a certain sheet thickness or less even in a case where the strength is increased. One purpose of increasing the strength of the steel sheet is to reduce the weight by making the steel sheet thinner. Accordingly, even in a case where a high strength steel sheet is developed, the site where the steel sheet is to be applied is limited in a case where the steel sheet has low corrosion resistance. Therefore, the steel sheet is considered to be plated with a hot-dip galvanizing coating or the like with high corrosion resistance. The plating layer is, for example, a galvanized layer such as a hot-dip galvanized layer or an electrogalvanized layer. In addition, the galvanized layer may be a plating containing Si, Al, and/or Mg in addition to Zn.

In addition, the hot-dip galvanized layer may be a hot-dip galvannealed layer. In the hot-dip galvannealed layer, Fe is incorporated into the hot-dip galvanized layer by the alloying treatment, so that excellent weldability and coatability can be obtained.

In addition, upper layer plating may be performed on the galvanized layer in order to improve the coatability and the weldability. In addition, in the steel sheet according to the present embodiment, various treatments such as a chromate treatment, a phosphate treatment, a lubricity improvement treatment, and a weldability improvement treatment may be performed on the hot-dip galvanized layer.

2. Welded Joint

Next, a welded joint according to the present embodiment will be described.

The welded joint according to the present embodiment is a welded joint obtained by welding the above-described steel sheet according to the present embodiment. Therefore, it has a base material portion, a nugget portion formed by welding, and a heat affected zone formed around the nugget portion. The steel sheet according to the present embodiment and another steel sheet (which may be the steel sheet according to the present embodiment) are joined via the nugget portion.

The base material portion (the portion excluding the heat affected zone and the nugget portion) has the same chemical composition and metallographic structure as the steel sheet according to the present embodiment. The heat affected zone has the same chemical composition as the steel sheet according to the present embodiment, but the metallographic structure thereof is mainly composed of martensite and has the following characteristics.

<Maximum Value of Prior γ Grain Diameter in Heat-Affected Zone: Less Than 30 μm>

In the welded joint, in order to reduce the residual stress in the heat affected zone, the maximum value of a prior γ grain diameter which corresponds to a block size of a martensite structure when the structure is martensite may be less than 30 μm. In a case where the prior γ (austenite) grain diameter is 30 μm or greater, residual stress is generated in a sheet thickness direction, and cracks easily occur therearound.

In the welded joint according to the present embodiment, the heat affected zone is defined as follows.

Figure 2:
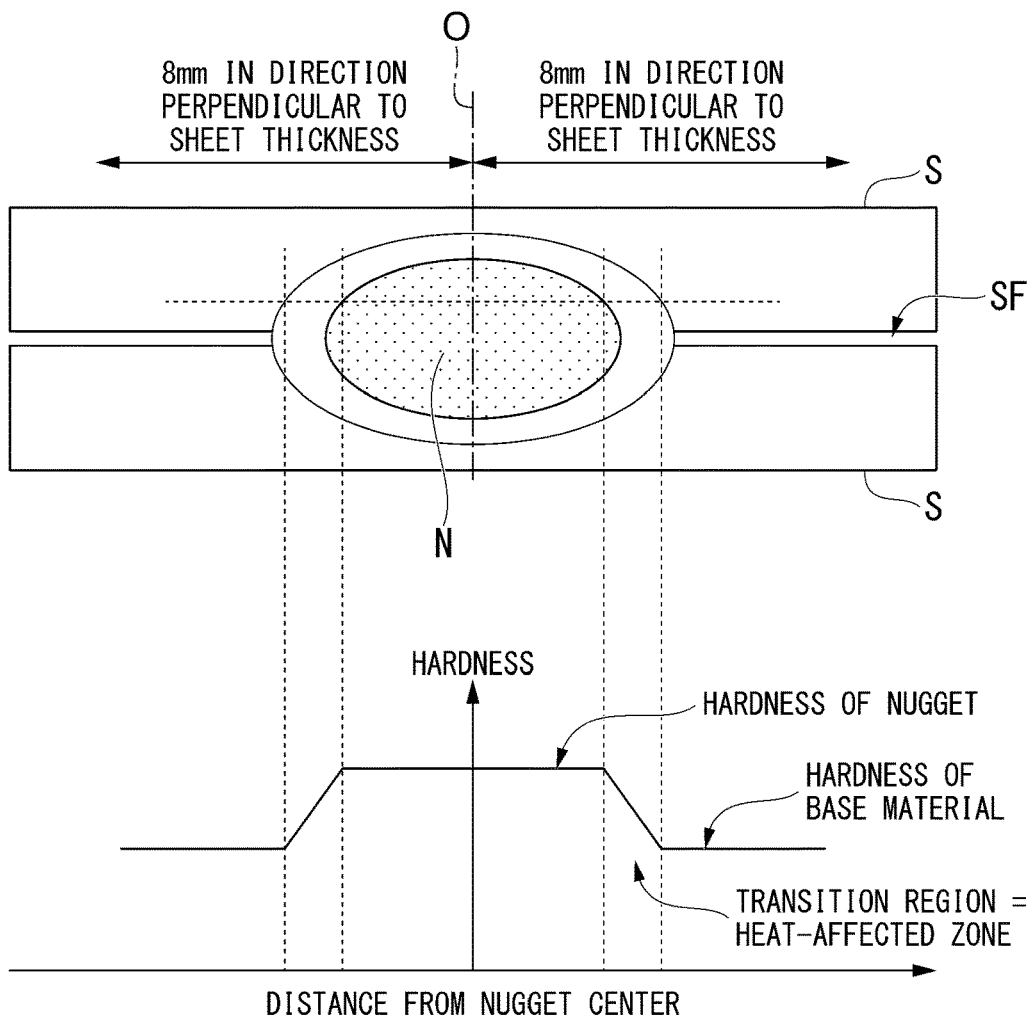
FIG. 2 is a schematic diagram showing a heat affected zone of a welded joint.
Figure 3:
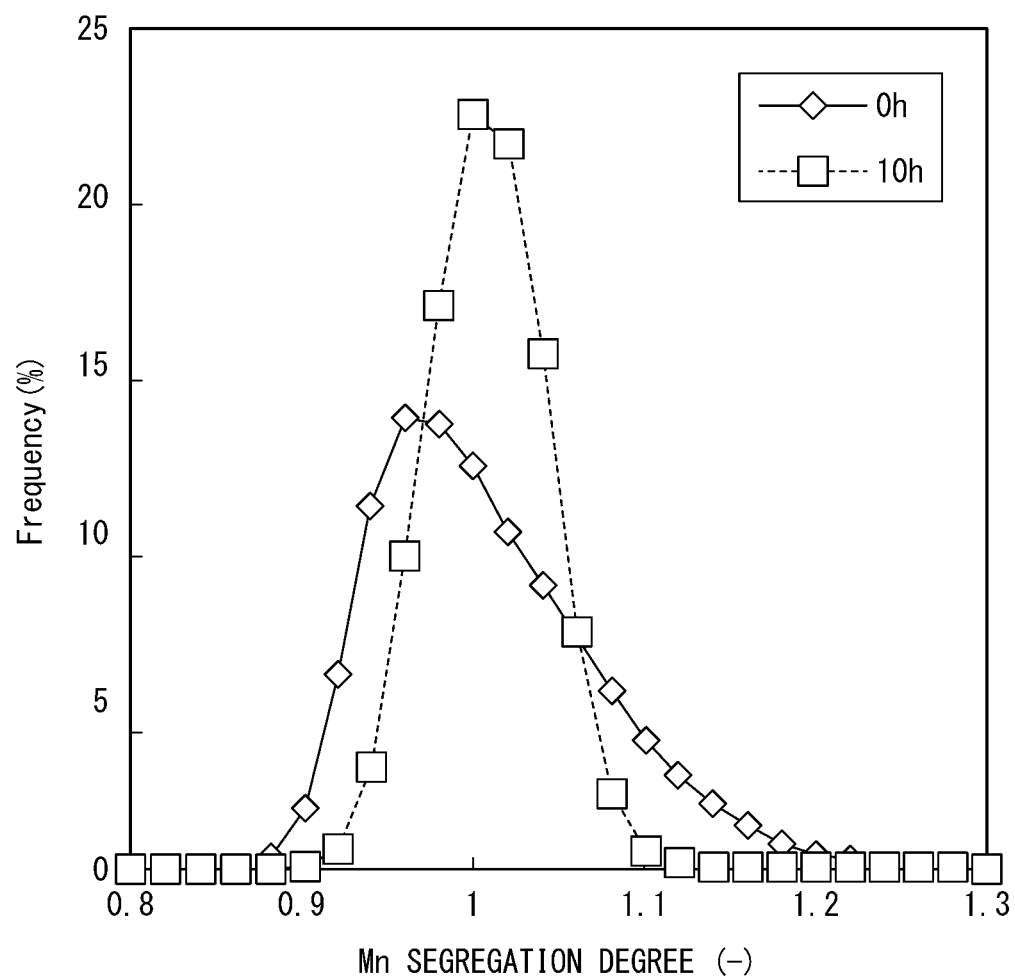
FIG. 3 is a histogram showing examples of Mn concentration distribution in a case where holding is not performed at 1,300° C. (0 h) and in a case where holding is performed for 10 hours (10 h) in a first segregation step.

As shown in FIG. 2, in a welded joint having a nugget (nugget portion) N joining steel sheets S, hardness (Vickers hardness at a load of 0.1 kgf: measured according to JIS Z 2244) is measured within a range of 8 mm in a direction perpendicular to the sheet thickness direction (lateral direction of paper in the drawing) from a nugget center O of spot welding at a position ¼ of the sheet thickness away from an overlapping surface SF (although there is a gap between the steel sheets S in the drawing, the steel sheets may be in close contact with each other) of the steel sheet in the sheet thickness direction on the overlapping surface side of the steel sheet, and a transition region having hardness different from the hardness of the nugget portion and the hardness of the base material portion (that is the same as the hardness of the steel sheet before welding) is defined as a heat affected zone (HAZ).

The prior γ grain diameter is measured by the following procedure at a center of the heat affected zone in a direction perpendicular to the sheet thickness (lateral direction of paper in the drawing) at a position ¼ of the sheet thickness away from the surface of the steel sheet on the overlapping surface side of the steel sheet. An observation surface of a sample is polished, and then corroded with a Nital reagent, and three visual fields each one of which has a size of 500 μm×500 are observed at a magnification of 1,000-fold using FE-SEM. Using the obtained structure photograph, the prior γ grain diameter is calculated by a line segment method.

The value obtained by averaging the maximum prior γ grain diameters in the three visual fields observed is defined as the maximum value of the prior γ grain diameter in the heat affected zone.

[Joint Strength]

The steel sheet according to the present embodiment preferably has a joint strength of greater than 6.0 kN in consideration of weldability in assembling of a vehicle body.

Regarding the joint strength, a test piece according to JIS Z 3137: 1999 is collected from the steel sheet in a direction perpendicular to the rolling direction, and welding is performed using a servo motor pressurized single-phase AC spot welding machine (power supply frequency: 50 Hz). Then, a cross tensile test is performed according to JIS Z 3137: 1999.

<Manufacturing Method>

The steel sheet according to the present embodiment can be manufactured by a manufacturing method including the following steps.

(I) A first Mn segregation reduction step in which a slab obtained by continuous casting or the like is held at 1.300° C. or higher for 5.0 hours or longer and cooled to 200° C. or lower at an average cooling rate of 20° C./hr or higher and 80° C./hr or lower;

(II) A second Mn segregation reduction step in which the slab is heated and held at 1,200° C. or higher for 1.0 hour or longer;

(III) A hot rolling step of hot-rolling the slab after the second Mn segregation reduction step to obtain a hot-rolled steel sheet;

(IV) A coiling step of coiling the hot-rolled steel sheet;

(V) A cold rolling step of cold-rolling the hot-rolled steel sheet after the coiling step to obtain a cold-rolled steel sheet; and (VI) An annealing step of annealing the cold-rolled steel sheet In addition, the welded joint according to the present embodiment can be manufactured by further performing the following step on the steel sheet according to the present embodiment obtained by the manufacturing method including (I) to (VI).

(VII) A welding step of welding the steel sheet

Hereinafter, the steps will be described.

[First Mn Segregation Reduction Step]

In the first Mn segregation reduction step, a slab obtained by continuous casting or the like is held at 1,300° C. or higher for 5.0 hours or longer before the hot rolling step and cooled to 200° C. or lower at an average cooling rate of 20° C./hr or higher and 80° C./hr or lower.

By holding the slab at a high temperature of 1,300° C. or higher for 5.0 hours or longer, the diffusion rate of Mn is increased, and the segregation of Mn is reduced. However, the segregation of Mn is not sufficiently reduced only by the holding. Furthermore, it is necessary to perform cooling to 200° C. or lower at an average cooling rate of 20° C./hr or higher. By cooling to 200° C. or lower at an average cooling rate of 20° C./hr or higher, dislocation due to a difference in thermal contraction is introduced. Since the dislocation becomes a high-speed diffusion path of Mn during heating in the next second Mn segregation reduction step, Ma can be efficiently diffused, and the Mn segregation degree is reduced.

The dislocation is introduced more as the average cooling rate is high. However, in a case where the cooling rate is too high, the difference in thermal contraction is excessive and the risk of slab cracking increases. Therefore, the average cooling rate is set to 80° C./hr or lower.

In a case where the heating temperature is excessively increased, the manufacturing cost is increased, and in a case where the heating time is increased, the productivity deteriorates. From these viewpoints, the heating temperature of the slab may be set to 1,400° C. or lower, and the holding time at 1,300° C. or higher may be set to 50.0 hours or shorter.

[Second Mn Segregation Reduction Step]

In the second Mn segregation reduction step, the slab after the first Mn segregation reduction step is heated to 1,200° C. or higher in a heating furnace and held for 1.0 hour or longer in that temperature range.

By performing the first Mn segregation reduction step and then holding the slab at 1,200° C. or higher for 1.0 hour or longer, the dislocation introduced into the slab can be used as a high-speed diffusion path, and Mn can be diffused. Therefore, the Mn segregation is further reduced.

In a case where the heating temperature is excessively increased, the manufacturing cost is increased, and in a case where the heating time is increased, the productivity deteriorates. From these viewpoints, the heating temperature of the slab may be set to 1,300° C. or lower, and the holding time at 1,200° C. or higher may be set to 5.0 hours or shorter.

The second Mn segregation reduction step may be performed in a hot rolling heating furnace as heating for hot rolling.

[Hot Rolling Step]

In the hot rolling step, the slab heated to 1.200° C. or higher in the hot rolling heating furnace in the second Mn segregation reduction step and held for 1.0 hour or longer is hot-rolled to obtain a hot-rolled steel sheet.

The hot rolling conditions are not particularly limited. For example, the finish rolling step may be completed at 800° C. or higher and 980° C. or lower, and then the hot-rolled steel sheet may be cooled to a temperature of 600° C. or higher and 750° C. or lower at an average cooling rate of 2.5° C./sec or higher and cooled to a coiling temperature of 600° C. or lower.

[Coiling Step]

[Cold Rolling Step]

The hot-rolled steel sheet after the hot rolling step is coiled into a hot-rolled coil under known conditions, and then cold-rolled under known conditions to obtain a cold-rolled steel sheet. For example, the total rolling reduction may be 20% or greater and 85% or less.

[Annealing Step]

In the annealing step, in order to adjust the tensile strength to 980 MPa or greater after the annealing step, annealed is performed under conditions in which the ferrite volume percentage is 20% or greater and the total of the bainite volume percentage and the martensite volume percentage is 40% or greater in the metallographic structure.

Specifically, the cold-rolled steel sheet is heated to a soaking temperature of (Ac3−100)° C. or higher and lower than 900° C. using a continuous annealing furnace or the like, held at the soaking temperature for 5 to 600 seconds, and cooled so that the average cooling rate in a temperature range of 500° C. to 750° C. is 2.5° C./sec or higher and 30.0° C./sec or lower. The cooling rate in a temperature range of 500° C. or lower is not particularly specified, and reheating or isothermal holding may be performed at 500° C. or lower.

In a case where the soaking temperature is low, austenite cannot be obtained, and the volume percentages of bainite and martensite cannot be sufficiently obtained by subsequent cooling. Therefore, the soaking temperature is set to (Ac3−100°) C or higher. Meanwhile, in a case where the soaking temperature is too high, the manufacturing cost is increased. Therefore, the soaking temperature is preferably 900° C. or lower.

The soaking time is not limited, but in a case where the soaking time is shorter than 5 seconds, austenitizing may not sufficiently progress. Therefore, the soaking time is preferably 5 seconds or longer. Meanwhile, in a case where the soaking time is longer than 600 seconds, the productivity decreases. Therefore, the soaking time is preferably 600 seconds or shorter.

In addition, in a case where the average cooling rate at 500° C. to 750° C. is 2.5° C./sec or lower, the volume percentage of ferrite becomes too large, and the volume percentages of bainite and martensite cannot be sufficiently obtained. Meanwhile, in a case where the average cooling rate is higher than 50.0° C./sec, the volume percentage of ferrite cannot be sufficiently obtained.

The Ac3 point is obtained by the following method.

$$Ac3(°C.)=910-203\times\sqrt{[C]}+44.7\times[Si]-30\times[Mn]+700\times[P]-20\times[Cu]-15.2\times[Ni]-11\times[Cr]+31.5\times[Mo]+400\times[Ti]+104\times[V]+120\times[Al]$$

Here, [C], [Si], [Mn], [P], [Cu], [Ni], [Cr], [Mo], [Ti], [V], and [Al] represent contents (mass %) of the elements contained in the slab, respectively.

[Hot-Dip Galvanizing Step]
[Alloying Step]

The cold-rolled steel sheet after the annealing step may be dipped in a hot-dip galvanizing bath to obtain a hot-dip galvanized steel sheet having a hot-dip galvanized layer on a surface thereof. In addition, the hot-dip galvanized steel sheet may be alloyed to obtain a galvannealed steel sheet. In this case, the temperature of the steel sheet can be kept as described above by using the heat applied to the steel sheet during hot-dip galvanizing and alloying. In any case, known conditions can be applied.

[Welding Step]

The welded joint according to the present embodiment is obtained by welding the steel sheet according to the present embodiment obtained through the above steps.

The welding conditions may be known conditions, but welding which is performed using a servo motor pressurized single-phase AC spot welding machine (power supply frequency: 50 Hz) under conditions in which the electrode diameter is set to 6 mm, the welding pressure during welding is set to 4 kN, the welding current is set to 6.0 kA to 9.0 kA, the energization time is set to 0.4 seconds, and the holding time is set to 0.1 seconds so that the nugget diameter is 5 It (t: sheet thickness) is an exemplary example.

Examples

Slabs (Steel Nos. A to Z) having a chemical composition shown in Tables 1-1 and 1-2 (unit: mass %, remainder: Fe and impurities) were produced by continuous casting.

These slabs were heated, held, and cooled to 200° C. or lower as shown in Tables 2-1 and 2-2.

After that, the slab was further heated and held again as shown in Tables 2-1 and 2-2, and then hot-rolled so that finish rolling was completed at 800° C. to 980° C. Then, the steel was cooled to a coiling temperature of 600° C. or lower so that the average cooling rate up to a temperature of 600° C. or higher and 750° C. or lower was 2.5° C./sec or higher, and the steel was coiled at 600° C. or lower. Thus, a hot-rolled steel sheet of 2.0 to 4.0 mm was obtained.

In addition, these hot-rolled steel sheets were cold-rolled at a rolling reduction of 20% to 85% to obtain cold-rolled steel sheets of 0.8 to 2.0 mm.

These cold-rolled steel sheets were annealed under conditions shown in Tables 2-1 and 2-2 (in a case where the slab was cracked, the steps after the hot rolling were not performed).

In addition, as shown in Tables 2-1 and 2-2, some cold-rolled steel sheets were hot-dip galvanized, and some cold-rolled steel sheets after hot-dip galvanizing were alloyed.

A sample was collected from the obtained cold-rolled steel sheet (including the plated steel sheet) in the above-described manner, and the microstructure was observed to obtain the volume percentage of ferrite, the total volume percentage of martensite and bainite, and the volume percentage of others (residual austenite and/or pearlite).

In addition, the Ma concentration was measured using EPMA in the above-described manner, and a proportion of measurement points at which (concentration at measurement point)/(average concentration at all measurement points in measurement region) (that is, segregation degree) was 1.1 or greater was obtained.

The results are shown in Tables 3-1 and 3-2.

In addition, from the obtained cold-rolled steel sheet, a JIS No. 5 tensile test piece was collected in a direction perpendicular to the rolling direction, and a tensile test was performed according to JIS Z 2241: 2011 to obtain the tensile strength and the total elongation.

In a case where a tensile strength (TS) was 980 MPa or greater and tensile strength×total elongation (TS×tEl) was 10,500 MPa·% or greater, the steel sheet was judged to have a high strength and excellent formability.

The results are shown in Tables 4-1 and 4-2.

In addition, a test piece according to JIS Z 3137: 1999 was collected from the cold-rolled steel sheet after annealing in a direction perpendicular to the rolling direction, and welding was performed using a servo motor pressurized single-phase AC spot welding machine (power supply frequency: 50 Hz) with an electrode diameter set to 6 mm, a welding pressure during welding set to 4 kN, a welding current set to 6.0 kA to 9.0 kA, an energization time set to 0.4 seconds, and a holding time set to 0.1 seconds so that the nugget diameter was 5 √t (t: sheet thickness). Then, by performing a cross tensile test according to JIS Z 3137: 1999, the joint strength was obtained.

In a case where the joint strength was greater than 6.0 kN, the welded joint was judged to have an excellent welded joint strength.

In addition, the maximum value of a prior γ grain diameter in a heat affected zone of the welded joint was obtained in the above-described manner.

The results are shown in Tables 3-1, 3-2, 4-1, and 4-2.

TABLE 1-1

| No. | C | Si | Mn | Al | P | S | N | O | Cr | Ni | Cu | Mo | Ti | Nb | V | B |
|---|---|---|---|---|---|---|---|---|---|---|---|---|---|---|---|---|
| A | 0.12 | 0.75 | 2.20 | 1.024 | 0.025 | 0.001 | 0.0004 | 0.0017 | | | | | | | | |
| B | 0.25 | 1.18 | 2.03 | 0.095 | 0.004 | 0.001 | 0.0028 | 0.0005 | | | | | | | | |
| C | 0.22 | 0.94 | 1.60 | 0.174 | 0.033 | 0.001 | 0.0006 | 0.0050 | | | | | | | | |
| D | 0.09 | 1.29 | 1.68 | 0.067 | 0.003 | 0.001 | 0.0006 | 0.0006 | | | | | | | | |

TABLE 1-1-continued

| No. | C | Si | Mn | Al | P | S | N | O | Cr | Ni | Cu | Mo | Ti | Nb | V | B |
|---|---|---|---|---|---|---|---|---|---|---|---|---|---|---|---|---|
| E | 0.08 | 1.71 | 2.47 | 0.095 | 0.011 | 0.006 | 0.0014 | 0.0007 | | | | | | | | |
| F | 0.20 | 0.09 | 2.64 | 0.181 | 0.006 | 0.003 | 0.0007 | 0.0006 | | | | | | | | |
| G | 0.18 | 1.49 | 2.97 | 0.363 | 0.002 | 0.001 | 0.0008 | 0.0041 | | | | | | | | |
| H | 0.06 | 0.31 | 2.35 | 1.267 | 0.002 | 0.001 | 0.0085 | 0.0009 | | | | | | | | |
| I | 0.16 | 0.48 | 1.87 | 0.236 | 0.002 | 0.008 | 0.0009 | 0.0005 | 0.40 | | | 0.39 | | | | 0.0074 |
| J | 0.14 | 1.88 | 2.76 | 0.111 | 0.003 | 0.001 | 0.0066 | 0.0005 | | | | | 0.020 | | | 0.0074 |
| K | 0.14 | 1.76 | 1.73 | 0.241 | 0.004 | 0.008 | 0.0010 | 0.0005 | 0.05 | | 0.06 | | 0.032 | 0.010 | | 0.0007 |
| L | 0.20 | 1.36 | 2.04 | 0.156 | 0.033 | 0.006 | 0.0006 | 0.0003 | | | | | 0.172 | 0.049 | 0.049 | |
| M | 0.22 | 1.97 | 2.33 | 1.011 | 0.004 | 0.001 | 0.0068 | 0.0009 | | 0.06 | 0.06 | 0.06 | | 0.018 | | |
| N | 0.08 | 1.52 | 1.90 | 0.089 | 0.004 | 0.001 | 0.0009 | 0.0041 | 0.02 | | | 0.43 | 0.012 | | | 0.0029 |
| O | 0.12 | 0.97 | 2.13 | 0.101 | 0.004 | 0.001 | 0.0014 | 0.0050 | 0.04 | | | 0.14 | | | | |
| P | 0.18 | 0.67 | 2.76 | 0.086 | 0.005 | 0.001 | 0.0006 | 0.0005 | | | | | 0.013 | | | 0.0007 |
| Q | 0.25 | 0.52 | 2.45 | 0.149 | 0.010 | 0.001 | 0.0025 | 0.0006 | 0.03 | | 0.08 | | 0.130 | 0.016 | | 0.0011 |
| R | 0.10 | 0.18 | 2.97 | 1.258 | 0.004 | 0.001 | 0.0008 | 0.0005 | | | | | 0.014 | 0.023 | 0.045 | |
| S | 0.16 | 1.16 | 1.58 | 0.132 | 0.027 | 0.002 | 0.0082 | 0.0014 | | 0.63 | 0.15 | 0.05 | | 0.023 | | |
| T | 0.06 | 0.31 | 2.60 | 0.349 | 0.004 | 0.001 | 0.0008 | 0.0004 | 0.04 | | | 0.32 | 0.058 | | | 0.0006 |
| U | 0.04 | 0.54 | 2.33 | 0.078 | 0.003 | 0.001 | 0.0084 | 0.0046 | 0.03 | 0.06 | | | 0.043 | 0.035 | 0.061 | 0.0065 |
| V | 0.28 | 1.21 | 2.65 | 0.130 | 0.009 | 0.001 | 0.0004 | 0.0005 | | | | | | | | |
| W | 0.15 | 0.03 | 2.37 | 0.123 | 0.009 | 0.001 | 0.0005 | 0.0010 | | | | | | | | |
| X | 0.11 | 2.15 | 2.07 | 0.097 | 0.002 | 0.001 | 0.0011 | 0.0022 | | | 0.07 | 0.03 | | | 0.394 | |
| Y | 0.16 | 1.45 | 1.37 | 0.797 | 0.004 | 0.001 | 0.0009 | 0.0030 | 0.13 | 0.13 | 0.83 | | 0.013 | 0.024 | | |
| Z | 0.23 | 0.07 | 3.16 | 0.181 | 0.002 | 0.001 | 0.0008 | 0.0025 | | | 0.35 | | 0.012 | 0.021 | 0.043 | |

TABLE 1-2

| No. | W | Ta | Sn | Co | Sb | As | Mg | Ca | Y | La | Ce | Zr | Ac3 (° C.) | Ac3 − 100 (° C.) |
|---|---|---|---|---|---|---|---|---|---|---|---|---|---|---|
| A | | | | | | | | | | | | | 948 | 848 |
| B | | | | | | | | | | | | | 815 | 715 |
| C | | | | | | | | | | | | | 853 | 753 |
| D | | | | | | | | | | | | | 867 | 767 |
| E | | | | | | | | | | | | | 874 | 774 |
| F | | | | | | | | | | | | | 770 | 670 |
| G | | | | | | | | | | | | | 846 | 746 |
| H | | | | | | | | | | | | | 957 | 857 |
| I | | | | | | | | | | | | | 832 | 732 |
| J | | | | | | | | | | | | | 859 | 759 |
| K | | | | | | | | | | | | | 904 | 804 |
| L | | | | | | | | | | | | | 935 | 835 |
| M | | | | | | | | | | | | | 957 | 857 |
| N | | | | | | | | | | | | | 895 | 795 |
| O | 0.0016 | 0.0013 | 0.0331 | | | | | | 0.0050 | | 0.0044 | | 838 | 738 |
| P | 0.0006 | 0.0010 | | | | 0.0039 | | 0.0030 | 0.0030 | 0.0136 | | | 790 | 690 |
| Q | | | | 0.0036 | 0.0327 | | | 0.0015 | 0.0030 | | | 0.0045 | 833 | 733 |
| R | 0.0027 | | 0.0067 | 0.0030 | | 0.0142 | 0.0430 | 0.0042 | 0.0021 | | | | 929 | 829 |
| S | | 0.0007 | | | | 0.0024 | 0.0081 | 0.0071 | | 0.0063 | 0.0316 | 0.0337 | 857 | 757 |
| T | 0.0006 | 0.0009 | | | 0.0067 | 0.0028 | 0.0036 | | | 0.0041 | | | 874 | 774 |
| U | | 0.0008 | | | | 0.0233 | 0.0023 | | | | 0.0054 | 0.0060 | 857 | 757 |
| V | | | | | | | | | | | | | 799 | 699 |
| W | | | | | | | | | | | | | 783 | 683 |
| X | | | | | 0.0380 | 0.0178 | | | 0.0045 | | | | 930 | 830 |
| Y | 0.0006 | 0.0075 | 0.0227 | 0.0032 | 0.0022 | 0.0116 | 0.0028 | | 0.0054 | 0.0125 | 0.0041 | | 936 | 836 |
| Z | | | | | | | | | | | | | 746 | 646 |

TABLE 2-1

| | | Min Segregation Reduction Step | | | Hot Rolling Step | | Annealing Step | | | |
|---|---|---|---|---|---|---|---|---|---|---|
| No. | Steel No. | Heating Temperature (° C.) | Holding Time (hr) | Average Cooling Rate up to 200° C. or Lower (° C./hr) | Heating Temperature (° C.) | Holding Time (hr) | Heating Temperature (° C.) | Holding Time (sec) | Average Cooling Rate at 500° C. to 750° C. (° C./sec) | Plating |
| 1 | A | 1308 | 6.8 | 35 | 1206 | 4.8 | 876 | 540 | 21.0 | Hot-Dip Galvanizing |
| 2 | B | 1386 | 6.8 | 59 | 1209 | 3.2 | 807 | 74 | 17.0 | |
| 3 | C | 1317 | 5.6 | 54 | 1221 | 4.6 | 839 | 485 | 7.0 | Hot-Dip Galvannealing |
| 4 | D | 1309 | 5.7 | 75 | 1280 | 4.0 | 897 | 282 | 9.0 | |
| 5 | E | 1370 | 6.4 | 68 | 1209 | 1.8 | 880 | 156 | 14.0 | |

TABLE 2-1-continued

| | | Mn Segregation Reduction Step | | | Hot Rolling Step | | Annealing Step | | | |
|---|---|---|---|---|---|---|---|---|---|---|
| | | | | Average Cooling | | | | | Average Cooling | |
| No. | Steel No. | Heating Temperature (° C.) | Holding Time (hr) | Rate up to 200° C. or Lower (° C./hr) | Heating Temperature (° C.) | Holding Time (hr) | Heating Temperature (° C.) | Holding Time (sec) | Rate at 500° C. to 750° C. (° C./sec) | Plating |
| 6 | F | 1306 | 7.8 | 28 | 1209 | 1.5 | 753 | 79 | 8.0 | |
| 7 | G | 1307 | 8.1 | 26 | 1269 | 4.6 | 785 | 403 | 16.0 | |
| 8 | H | 1310 | 7.5 | 47 | 1207 | 4.6 | 890 | 348 | 4.0 | |
| 9 | I | 1305 | 5.8 | 79 | 1210 | 4.4 | 879 | 107 | 5.0 | |
| 10 | J | 1313 | 7.4 | 36 | 1208 | 2.4 | 890 | 243 | 22.0 | Hot-Dip Galvannealing |
| 11 | K | 1315 | 7.0 | 44 | 1211 | 4.7 | 856 | 436 | 26.0 | |
| 12 | L | 1320 | 5.5 | 39 | 1206 | 4.2 | 884 | 358 | 25.0 | |
| 13 | M | 1327 | 6.4 | 64 | 1206 | 4.8 | 875 | 326 | 18.0 | |
| 14 | N | 1311 | 6.1 | 60 | 1207 | 4.7 | 899 | 505 | 12.0 | Hot-Dip Galvanizing |
| 15 | O | 1380 | 6.5 | 66 | 1230 | 4.4 | 822 | 193 | 29.0 | |
| 16 | P | 1305 | 6.1 | 51 | 1208 | 4.6 | 696 | 235 | 6.0 | |
| 17 | Q | 1344 | 5.8 | 48 | 1246 | 4.7 | 810 | 582 | 28.0 | Hot-Dip Galvannealing |
| 18 | R | 1306 | 7.6 | 73 | 1214 | 1.7 | 867 | 138 | 19.0 | Hot-Dip Galvannealing |
| 19 | S | 1306 | 7.2 | 22 | 1210 | 4.7 | 870 | 467 | 13.0 | Hot-Dip Galvannealing |
| 20 | T | 1306 | 8.0 | 31 | 1285 | 1.6 | 850 | 17 | 23.0 | |
| 21 | A | 1305 | 7.6 | 47 | 1207 | 1.5 | 851 | 365 | 4.0 | Hot-Dip Galvannealing |
| 22 | B | 1306 | 8.0 | 51 | 1204 | 1.8 | 759 | 316 | 8.0 | |
| 23 | C | 1317 | 6.3 | 27 | 1210 | 3.8 | 851 | 121 | 18.0 | Hot-Dip Galvannealing |
| 24 | D | 1309 | 5.8 | 75 | 1246 | 4.6 | 782 | 222 | 21.0 | |
| 25 | E | 1308 | 7.0 | 47 | 1211 | 4.6 | 843 | 477 | 29.0 | |
| 26 | F | 1317 | 6.0 | 76 | 1284 | 4.6 | 726 | 529 | 27.0 | |
| 27 | G | 1344 | 7.0 | 66 | 1212 | 2.3 | 845 | 354 | 15.0 | |
| 28 | H | 1311 | 6.1 | 22 | 1209 | 3.2 | 873 | 591 | 15.0 | Hot-Dip Galvannealing |
| 29 | I | 1307 | 5.6 | 35 | 1219 | 4.6 | 734 | 394 | 22.0 | |
| 30 | J | 1309 | 5.6 | 69 | 1280 | 4.7 | 854 | 30 | 24.0 | |
| 31 | K | 1312 | 5.9 | 61 | 1207 | 4.5 | 867 | 293 | 7.0 | |
| 32 | L | 1328 | 7.5 | 44 | 1204 | 4.3 | 879 | 248 | 5.0 | |
| 33 | M | 1308 | 6.7 | 56 | 1210 | 4.6 | 861 | 450 | 10.0 | |
| 34 | N | 1305 | 7.3 | 55 | 1216 | 4.4 | 822 | 167 | 28.0 | |
| 35 | O | 1387 | 6.7 | 31 | 1206 | 4.8 | 767 | 64 | 20.0 | |

TABLE 2-2

| | | Mn Segregation Reduction Step | | | Hot Rolling Step | | Annesting Step | | | |
|---|---|---|---|---|---|---|---|---|---|---|
| | | | | Average Cooling | | | | | Average Cooling | |
| No. | Steel No. | Heating Temperature (° C.) | Holding Time (hr) | Rate up to 200° C. or Lower (° C./hr) | Heating Temperature (° C.) | Holding Time (hr) | Heating Temperature (° C.) | Holding Time (sec) | Rate at 500° C. to 750° C. (° C./sec) | Plating |
| 36 | P | 1313 | 7.7 | 72 | 1266 | 4.7 | 769 | 436 | 18.0 | |
| 37 | Q | 1366 | 5.7 | 61 | 1229 | 1.6 | 791 | 208 | 13.0 | Hot-Dip Galvannealing |
| 38 | R | 1308 | 6.8 | 40 | 1206 | 4.8 | 893 | 72 | 9.0 | |
| 39 | S | 1306 | 7.1 | 27 | 1208 | 4.3 | 843 | 559 | 24.0 | Hot-Dip Galvannealing |
| 40 | T | 1377 | 6.3 | 37 | 1213 | 2.0 | 791 | 130 | 11.0 | |
| 41 | A | 1304 | 5.7 | 28 | 1204 | 3.9 | 874 | 337 | 20.0 | Hot-Dip Galvannealing |
| 42 | B | 1345 | 7.0 | 27 | 1207 | 1.6 | 815 | 238 | 28.0 | |
| 43 | C | 1309 | 7.8 | 29 | 1220 | 4.2 | 853 | 388 | 12.0 | |
| 44 | D | 1307 | 8.0 | 32 | 1281 | 4.5 | 784 | 136 | 23.0 | |
| 45 | E | 1308 | 8.1 | 78 | 1206 | 4.7 | 788 | 46 | 25.0 | |
| 46 | F | 1331 | 5.6 | 24 | 1206 | 1.8 | 770 | 83 | 6.0 | |
| 47 | G | 1304 | 7.7 | 56 | 1205 | 4.5 | 785 | 270 | 4.0 | Hot-Dip Galvanizing |
| 48 | H | 1382 | 7.5 | 61 | 1207 | 1.8 | 898 | 185 | 8.0 | Hot-Dip Galvannealing |
| 49 | I | 1315 | 7.1 | 38 | 1213 | 4.7 | 813 | 314 | 14.0 | |
| 50 | J | 1367 | 6.3 | 60 | 1205 | 4.7 | 832 | 162 | 29.0 | |

TABLE 2-2-continued

|  |  | Mn Segregation Reduction Step | | | Annealing Step | | | | | |
|---|---|---|---|---|---|---|---|---|---|---|
|  |  |  |  | Average Cooling | Hot Rolling Step | | | | Average Cooling | |
| No. | Steel No. | Heating Temperature (°C.) | Holding Time (hr) | Rate up to 200° C. or Lower (° C./hr) | Heating Temperature (°C.) | Holding Time (hr) | Heating Temperature (°C.) | Holding Time (sec) | Rate at 500° C. to 750° C. (° C./sec) | Plating |
| 51 | K | 1314 | 7.8 | 69 | 1212 | 4.7 | 896 | 476 | 8.0 |  |
| 52 | L | 1308 | 5.5 | 76 | 1229 | 4.8 | 858 | 44 | 21.0 | Hot-Dip Galvanizing |
| 53 | M | 1377 | 8.0 | 57 | 1270 | 4.5 | 869 | 514 | 5.0 | Hot-Dip Galvannealing |
| 54 | N | 1308 | 6.8 | 45 | 1210 | 1.7 | 875 | 448 | 17.0 |  |
| 55 | U | 1306 | 6.2 | 51 | 1213 | 3.2 | 784 | 121 | 17.0 |  |
| 56 | V̄ | 1307 | 7.0 | 48 | 1208 | 4.6 | 824 | 579 | 10.0 |  |
| 57 | W̄ | 1320 | 5.9 | 41 | 1209 | 4.7 | 797 | 477 | 11.0 | Hot-Dip Galvannealing |
| 58 | X | 1310 | 5.8 | 71 | 1247 | 4.7 | 899 | 391 | 16.0 |  |
| 59 | Ȳ | 1308 | 6.2 | 67 | 1213 | 2.4 | 895 | 293 | 22.0 |  |
| 60 | Z̄ | 1313 | 7.9 | 41 | 1280 | 4.7 | 745 | 552 | 26.0 |  |
| 61 | Ō | 1276 | 7.0 | 55 | 1218 | 4.6 | 820 | 435 | 9.0 |  |
| 62 | Q | 1304 | 3.5 | 58 | 1205 | 1.5 | 887 | 552 | 12.0 |  |
| 63 | S | 1306 | 7.9 | 18 | 1209 | 2.3 | 836 | 66 | 27.0 |  |
| 64 | T | 1329 | 6.7 | 82 | Subsequent tests were stopped due to the cracked slab. | | | | | |
| 65 | A | 1319 | 7.6 | 39 | 1196 | 4.6 | 850 | 355 | 25.0 |  |
| 66 | C | 1307 | 6.4 | 68 | 1209 | 0.7 | 828 | 283 | 15.0 | Hot-Dip Galvannealing |
| 67 | E | 1387 | 6.4 | 79 | 1282 | 4.7 | 754 | 265 | 19.0 |  |
| 68 | G | 1379 | 6.3 | 75 | 1206 | 4.6 | 890 | 2 | 4.0 |  |
| 69 | I | 1312 | 6.5 | 40 | 1204 | 1.5 | 831 | 385 | 1.5 |  |
| 70 | J | 1312 | 6.4 | 23 | 1211 | 4.5 | 797 | 579 | 34.0 |  |
| 71 | A | — | — | — | 1208 | 3.9 | 877 | 335 | 20.2 | Hot-Dip Galvannealing |

TABLE 3-1

|  | Steel Sheet Microstructure | | | | Welded Joint |
|---|---|---|---|---|---|
| No. | Volume Percentage of Ferrite (%) | Volume Percentage of Martensite + Bainite (%) | Volume Percentage of Remainder (%) | Proportion of Measurement Points at Which Mn Segregation Degree is 1.1 or Greater (%) | Maximum Value of Prior γ Grain Diameter in Heat-Affected Zone (μm) |
| 1 | 21 | 79 | 0 | 4.8 | 22 |
| 2 | 37 | 62 | 1 | 4.6 | 25 |
| 3 | 37 | 61 | 2 | 3.4 | 29 |
| 4 | 32 | 67 | 1 | 1.9 | 22 |
| 5 | 24 | 74 | 2 | 4.1 | 27 |
| 6 | 20 | 78 | 2 | 4.2 | 21 |
| 7 | 27 | 73 | 0 | 4.5 | 26 |
| 8 | 32 | 68 | 0 | 6.0 | 29 |
| 9 | 32 | 67 | 1 | 4.0 | 25 |
| 10 | 53 | 46 | 1 | 5.3 | 25 |
| 11 | 57 | 41 | 2 | 5.7 | 25 |
| 12 | 60 | 40 | 0 | 3.1 | 27 |
| 13 | 27 | 71 | 2 | 4.8 | 23 |
| 14 | 24 | 74 | 2 | 4.0 | 23 |
| 15 | 41 | 57 | 2 | 5.1 | 23 |
| 16 | 20 | 80 | 0 | 4.1 | 28 |
| 17 | 25 | 73 | 2 | 3.8 | 25 |
| 18 | 21 | 78 | 1 | 6.2 | 27 |
| 19 | 58 | 40 | 2 | 4.9 | 24 |
| 20 | 24 | 76 | 0 | 5.4 | 26 |
| 21 | 24 | 76 | 0 | 5.7 | 25 |
| 22 | 59 | 41 | 0 | 5.2 | 20 |
| 23 | 48 | 51 | 1 | 5.8 | 24 |
| 24 | 42 | 56 | 2 | 3.6 | 25 |
| 25 | 37 | 61 | 2 | 4.2 | 27 |
| 26 | 47 | 53 | 0 | 4.1 | 25 |
| 27 | 41 | 57 | 2 | 6.5 | 29 |
| 28 | 26 | 73 | 1 | 5.1 | 22 |
| 29 | 24 | 74 | 2 | 4.4 | 26 |
| 30 | 29 | 69 | 2 | 4.7 | 26 |
| 31 | 41 | 58 | 1 | 5.3 | 29 |

TABLE 3-1-continued

| | Steel Sheet Microstructure | | | | Welded Joint |
|---|---|---|---|---|---|
| No. | Volume Percentage of Ferrite (%) | Volume Percentage of Martensite + Bainite (%) | Volume Percentage of Remainder (%) | Proportion of Measurement Points at Which Mn Segregation Degree is 1.1 or Greater (%) | Maximum Value of Prior γ Grain Diameter in Heat-Affected Zone (μm) |
| 32 | 60 | 40 | 0 | 5.5 | 28 |
| 33 | 20 | 79 | 1 | 3.2 | 27 |
| 34 | 30 | 68 | 2 | 4.3 | 22 |
| 35 | 21 | 77 | 2 | 4.6 | 17 |

TABLE 3-2

| | Steel Sheet Microstructure | | | | Welded Joint |
|---|---|---|---|---|---|
| No. | Volume Percentage of Ferrite (%) | Volume Percentage of Martensite + Bainite (%) | Volume Percentage of Remainder (%) | Proportion of Measurement Points at Which Mn Segregation Degree is 1.1 or Greater (%) | Maximum Value of Prior γ Grain Diameter in Heat-Affected Zone (μm) |
| 36 | 24 | 74 | 2 | 4.4 | 20 |
| 37 | 49 | 50 | 1 | 2.3 | 29 |
| 38 | 43 | 56 | 1 | 4.6 | 23 |
| 39 | 34 | 65 | 1 | 3.3 | 27 |
| 40 | 41 | 58 | 1 | 4.1 | 26 |
| 41 | 52 | 47 | 1 | 4.7 | 27 |
| 42 | 28 | 71 | 1 | 4.6 | 21 |
| 43 | 57 | 42 | 1 | 6.4 | 25 |
| 44 | 40 | 59 | 1 | 3.8 | 27 |
| 45 | 54 | 45 | 1 | 5.0 | 28 |
| 46 | 54 | 45 | 1 | 4.6 | 26 |
| 47 | 50 | 50 | 0 | 4.9 | 28 |
| 48 | 60 | 40 | 0 | 5.5 | 25 |
| 49 | 25 | 73 | 2 | 4.5 | 24 |
| 50 | 28 | 71 | 1 | 5.0 | 28 |
| 51 | 59 | 40 | 1 | 4.1 | 23 |
| 52 | 23 | 77 | 0 | 3.6 | 28 |
| 53 | 36 | 63 | 1 | 5.1 | 26 |
| 54 | 22 | 76 | 2 | 5.1 | 24 |
| 55 | 41 | 58 | 1 | 5.9 | 27 |
| 56 | 39 | 59 | 2 | 4.7 | 25 |
| 57 | <u>17</u> | 78 | 5 | 3.9 | 21 |
| 58 | <u>42</u> | 57 | 1 | 5.2 | 29 |
| 59 | 62 | <u>37</u> | 1 | 3.0 | 22 |
| 60 | <u>16</u> | <u>83</u> | 1 | 5.2 | 21 |
| 61 | <u>58</u> | 41 | 1 | <u>14.0</u> | <u>38</u> |
| 62 | 54 | 44 | 2 | <u>13.3</u> | <u>37</u> |
| 63 | 57 | 41 | 2 | <u>11.4</u> | <u>36</u> |
| 64 | Subsequent tests were stopped due to the cracked slab. | | | | |
| 65 | 47 | 51 | 2 | <u>10.3</u> | <u>35</u> |
| 66 | 25 | 75 | 0 | <u>13.3</u> | <u>37</u> |
| 67 | 72 | 0 | 28 | 4.9 | 29 |
| 68 | 68 | <u>31</u> | 1 | 3.7 | 28 |
| 69 | 64 | <u>24</u> | 12 | 3.7 | 22 |
| 70 | <u>14</u> | <u>84</u> | 2 | 3.7 | 23 |
| 71 | <u>54</u> | 45 | 1 | <u>14.3</u> | <u>39</u> |

TABLE 4-1

| | Steel Sheet Mechanical Properties | | | Welded Joint | |
|---|---|---|---|---|---|
| No. | Tensile Strength (MPa) | Total Elongation (%) | Tensile Strength × Total Elongation (MPa %) | Welded Joint Strength (kN) | Remarks |
| 1 | 1108 | 13 | 14404 | 6.1 | Invention Example |
| 2 | 1281 | 11 | 14091 | 6.8 | Invention Example |
| 3 | 1243 | 10 | 12430 | 6.3 | Invention Example |
| 4 | 1272 | 10 | 12720 | 6.3 | Invention Example |

TABLE 4-1-continued

| No. | Steel Sheet Mechanical Properties | | | Welded Joint Welded Joint Strength (kN) | Remarks |
|---|---|---|---|---|---|
| | Tensile Strength (MPa) | Total Elongation (%) | Tensile Strength × Total Elongation (MPa %) | | |
| 5 | 1007 | 14 | 14098 | 6.8 | Invention Example |
| 6 | 1356 | 10 | 13560 | 6.3 | Invention Example |
| 7 | 1213 | 11 | 13343 | 6.1 | Invention Example |
| 8 | 1156 | 11 | 12716 | 6.3 | Invention Example |
| 9 | 1125 | 13 | 14625 | 6.5 | Invention Example |
| 10 | 1245 | 10 | 12450 | 6.6 | Invention Example |
| 11 | 1048 | 12 | 12576 | 6.1 | Invention Example |
| 12 | 986 | 12 | 11832 | 6.3 | Invention Example |
| 13 | 1247 | 12 | 14964 | 6.6 | Invention Example |
| 14 | 1577 | 10 | 15770 | 6.1 | Invention Example |
| 15 | 1279 | 10 | 12790 | 6.1 | Invention Example |
| 16 | 1228 | 11 | 13508 | 6.1 | Invention Example |
| 17 | 1402 | 10 | 14020 | 6.8 | Invention Example |
| 18 | 1038 | 14 | 14532 | 6.4 | Invention Example |
| 19 | 1038 | 15 | 15570 | 6.2 | Invention Example |
| 20 | 981 | 13 | 12753 | 6.3 | Invention Example |
| 21 | 1102 | 11 | 12122 | 6.3 | Invention Example |
| 22 | 991 | 12 | 11892 | 6.2 | Invention Example |
| 23 | 1062 | 12 | 12744 | 6.6 | Invention Example |
| 24 | 1097 | 12 | 13164 | 6.5 | Invention Example |
| 25 | 1266 | 10 | 12660 | 6.3 | Invention Example |
| 26 | 1078 | 11 | 11858 | 6.1 | Invention Example |
| 27 | 1098 | 13 | 14274 | 6.4 | Invention Example |
| 28 | 1448 | 10 | 14480 | 6.1 | Invention Example |
| 29 | 1178 | 13 | 15314 | 6.3 | Invention Example |
| 30 | 1038 | 12 | 12456 | 6.4 | Invention Example |
| 31 | 1005 | 12 | 12060 | 6.5 | Invention Example |
| 32 | 985 | 13 | 12805 | 6.5 | Invention Example |
| 33 | 1306 | 10 | 13060 | 6.6 | Invention Example |
| 34 | 1164 | 10 | 11640 | 6.2 | Invention Example |
| 35 | 1093 | 14 | 15302 | 6.4 | Invention Example |

TABLE 4-2

| No. | Steel Sheet Mechanical Properties | | | Welded Joint Welded Joint Strength (kN) | Remarks |
|---|---|---|---|---|---|
| | Tensile Strength (MPa) | Total Elongation (%) | Tensile Strength × Total Elongation (MPa %) | | |
| 36 | 1261 | 10 | 12610 | 6.5 | Invention Example |
| 37 | 1152 | 11 | 12672 | 6.4 | Invention Example |
| 38 | 1020 | 13 | 13260 | 6.3 | Invention Example |
| 39 | 1115 | 13 | 14495 | 6.3 | Invention Example |
| 40 | 1408 | 10 | 14080 | 6.7 | Invention Example |
| 41 | 1077 | 14 | 15078 | 6.1 | Invention Example |
| 42 | 1377 | 10 | 13770 | 6.3 | Invention Example |
| 43 | 987 | 13 | 12831 | 6.8 | Invention Example |
| 44 | 983 | 14 | 13762 | 6.2 | Invention Example |
| 45 | 988 | 13 | 12844 | 6.2 | Invention Example |
| 46 | 988 | 12 | 11856 | 6.7 | Invention Example |
| 47 | 1009 | 16 | 16144 | 6.2 | Invention Example |
| 48 | 1090 | 12 | 13080 | 6.2 | Invention Example |
| 49 | 1200 | 12 | 14400 | 6.3 | Invention Example |
| 50 | 1099 | 11 | 12089 | 6.3 | Invention Example |
| 51 | 1066 | 12 | 12792 | 6.2 | Invention Example |
| 52 | 1305 | 10 | 13050 | 6.1 | Invention Example |
| 53 | 1198 | 10 | 11980 | 6.2 | Invention Example |
| 54 | 998 | 13 | 12974 | 6.2 | Invention Example |
| 55 | 685 | 19 | 13015 | 6.1 | Comparative Example |
| 56 | 1308 | 7 | 9156 | 6.1 | Comparative Example |
| 57 | 1223 | 8 | 9784 | 6.9 | Comparative Example |
| 58 | 993 | 15 | 14895 | 5.4 | Comparative Example |
| 59 | 824 | 14 | 11536 | 6.5 | Comparative Example |
| 60 | 1270 | 7 | 8890 | 6.6 | Comparative Example |
| 61 | 1379 | 9 | 12411 | 5.2 | Comparative Example |
| 62 | 1103 | 11 | 12133 | 5.4 | Comparative Example |
| 63 | 981 | 13 | 12753 | 5.5 | Comparative Example |
| 64 | Subsequent tests were stopped due to the cracked slab. | | | | Comparative Example |
| 65 | 1169 | 11 | 12859 | 5.4 | Comparative Example |
| 66 | 1346 | 9 | 12114 | 5.1 | Comparative Example |
| 67 | 696 | 18 | 12528 | 6.4 | Comparative Example |
| 68 | 866 | 17 | 14722 | 6.3 | Comparative Example. |
| 69 | 835 | 16 | 13360 | 6.4 | Comparative Example |
| 70 | 1241 | 7 | 8687 | 6.5 | Comparative Example |
| 71 | 1075 | 13 | 13975 | 5.2 | Comparative Example |

As can be seen from Tables 1-1 to 4-2, all of the invention examples were steel sheets having excellent formability and a tensile strength of 980 MPa or greater. In addition, in the welded joint obtained by welding the steel sheet, the maximum value of the prior γ grain diameter in the heat affected zone was less than 30 μm, and the welded joint strength was also high.

On the other hand, in the comparative examples in which in the steel sheet, at least one of the chemical composition, the volume percentage of each phase of the microstructure, the maximum grain diameter of residual austenite, or the proportion of measurement points at which the segregation degree was 1.1 or greater did not satisfy the scope of the present invention, either one or more of tensile strength and formability did not satisfy the target value, or in the welded joint obtained using the above steel sheet, the maximum value of the prior γ grain diameter was large and the welded joint strength was low.

INDUSTRIAL APPLICABILITY

According to the present invention, it is possible to provide a steel sheet which has excellent formability and a tensile strength of 980 MPa or greater and can obtain a sufficient welded joint strength after welding, and a welded joint which is obtained from the steel sheet and can obtain a sufficient welded joint strength. Therefore, the present invention has high industrial applicability.

BRIEF DESCRIPTION OF THE REFERENCE SYMBOLS

A: region for structure observation (region of 100 μm×100 μm within range of t/8 to 3t/8 centered at t/4-position)
B: region for Mn concentration measurement (square region with side length of t/4 centered at t/4-position)
t: sheet thickness
O: nugget center
N: nugget
S: steel sheet (base steel sheet)
SF: overlapping surface

What is claimed is:
1. A steel sheet comprising, as a chemical composition, by mass %:
C: 0.05% to 0.25%;
Si: 0.05% to 2.00%;

Mn: 1.50% to 3.00%;
Al: 0.005% to 1.500%;
P: 0% to 0.040%;
S: 0% to 0.010%;
N: 0% to 0.0100%;
O: 0% to 0.0060%;
Cr: 0% to 0.50%;
Ni: 0% to 1.00%;
Cu: 0% to 1.00%;
Mo: 0% to 0.50%;
Ti: 0% to 0.200%;
Nb: 0% to 0.200%;
V: 0% to 0.500%;
B: 0% to 0.0100%;
W: 0% to 0.1000%;
Ta: 0% to 0.1000%;
Sn: 0% to 0.0500%;
Co: 0% to 0.5000%;
Sb: 0% to 0.0500%;
As: 0% to 0.0500%;
Mg: 0% to 0.0500%;
Ca: 0% to 0.0400%;
Y: 0% to 0.0500%;
La: 0% to 0.0500%;
Ce: 0% to 0.0500%;
Zr: 0% to 0.0500%; and
a remainder: Fe and impurities,
wherein when a sheet thickness is denoted by t, a metallographic structure at a t/4-position, which is a position t/4 away from a surface, in a cross section in a sheet thickness direction includes, by volume percentage,
ferrite: 20% or greater,
bainite and martensite: 40% or greater in total, and
a remainder consisting of one or more selected from residual austenite and pearlite,
when a Mn concentration is measured at a plurality of measurement points at intervals of 1 μm in a square region with a side length of t/4 centered at the t/4-position in the cross section in the sheet thickness direction, a proportion of measurement points at which the Mn concentration is 1.1 times or greater an average of the Mn concentrations at all of the plurality of measurement points is less than 10.0%,
a tensile strength is 980 MPa or greater, and
a product of the tensile strength and a total elongation is 10,500 MPa·% or greater.

2. The steel sheet according to claim 1,
wherein the chemical composition contains, by mass %, one or more of:
Cr: 0.01% to 0.50%;
Ni: 0.01% to 1.00%;
Cu: 0.01% to 1.00%;
Mo: 0.01% to 0.50%;
Ti: 0.001% to 0.200%;
Nb: 0.001% to 0.200%;
V: 0.001% to 0.500%;
B: 0.0001% to 0.0100%;
W: 0.0005% to 0.1000%;
Ta: 0.0005% to 0.1000%;
Sn: 0.0010% to 0.0500%;
Co: 0.0010% to 0.5000%;
Sb: 0.0010% to 0.0500%;
As: 0.0010% to 0.0500%;
Mg: 0.0001% to 0.0500%;
Ca: 0.0001% to 0.0400%;
Y: 0.0001% to 0.0500%;
La: 0.0001% to 0.0500%;
Ce: 0.0001% to 0.0500%; and
Zr: 0.0001% to 0.0500%.

3. The steel sheet according to claim 1,
wherein the steel sheet has a hot-dip galvanized layer on the surface.

4. The steel sheet according to claim 3,
wherein the hot-dip galvanized layer is a hot-dip galvannealed layer.

5. A spot welded joint comprising:
a base material portion;
a nugget portion; and
a heat affected zone,
wherein the base material portion contains, as a chemical composition, by mass %,
C: 0.05% to 0.25%,
Si: 0.05% to 2.00%,
Mn: 1.50% to 3.00%,
Al: 0.005% to 1.500%,
P: 0% to 0.040%,
S: 0% to 0.010%,
N: 0% to 0.0100%,
O: 0% to 0.0060%,
Cr: 0% to 0.50%,
Ni: 0% to 1.00%,
Cu: 0% to 1.00%,
Mo: 0% to 0.50%,
Ti: 0% to 0.200%,
Nb: 0% to 0.200%,
V: 0% to 0.500%,
B: 0% to 0.0100%,
W: 0% to 0.1000%,
Ta: 0% to 0.1000%,
Sn: 0% to 0.0500%,
Co: 0% to 0.5000%,
Sb: 0% to 0.0500%,
As: 0% to 0.0500%,
Mg: 0% to 0.0500%,
Ca: 0% to 0.0400%,
Y: 0% to 0.0500%,
La: 0% to 0.0500%,
Ce: 0% to 0.0500%,
Zr: 0% to 0.0500%, and
a remainder: Fe and impurities, and
a maximum value of a prior γ grain diameter in the heat affected zone is less than 30 μm.

6. A steel sheet comprising, as a chemical composition, by mass %:
C: 0.05% to 0.25%;
Si: 0.05% to 2.00%;
Mn: 1.50% to 3.00%;
Al: 0.005% to 1.500%;
P: 0% to 0.040%;
S: 0% to 0.010%;
N: 0% to 0.0100%;
O: 0% to 0.0060%;
Cr: 0% to 0.50%;
Ni: 0% to 1.00%;
Cu: 0% to 1.00%;
Mo: 0% to 0.50%;
Ti: 0% to 0.200%;
Nb: 0% to 0.200%;
V: 0% to 0.500%;
B: 0% to 0.0100%;
W: 0% to 0.1000%;
Ta: 0% to 0.1000%;
Sn: 0% to 0.0500%;
Co: 0% to 0.5000%;

Sb: 0% to 0.0500%;
As: 0% to 0.0500%;
Mg: 0% to 0.0500%;
Ca: 0% to 0.0400%;
Y: 0% to 0.0500%;
La: 0% to 0.0500%;
Ce: 0% to 0.0500%;
Zr: 0% to 0.0500%; and
a remainder: Fe and impurities,
wherein when a sheet thickness is denoted by t, a metallographic structure at a t/4-position, which is a position t/4 away from a surface, in a cross section in a sheet thickness direction includes, by volume percentage,
ferrite: 20% or greater,
bainite and martensite: 40% or greater in total, and
a remainder comprising one or more selected from residual austenite and pearlite,
when a Mn concentration is measured at a plurality of measurement points at intervals of 1 μm in a square region with a side length of t/4 centered at the t/4-position in the cross section in the sheet thickness direction, a proportion of measurement points at which the Mn concentration is 1.1 times or greater an average of the Mn concentrations at all of the plurality of measurement points is less than 10.0%,
a tensile strength is 980 MPa or greater, and
a product of the tensile strength and a total elongation is 10,500 MPa·% or greater.

7. The spot welded joint according to claim 5, wherein the prior γ grain diameter in the heat affected zone is at least 17 μm.

8. A spot welded joint comprising:
a base material portion;
a nugget portion; and
a heat affected zone,
wherein a maximum value of a prior γ grain diameter in the heat affected zone is less than 30 μm, and
wherein the base material portion is a steel sheet comprising, as a chemical composition, by mass %,
C: 0.05% to 0.25%,
Si: 0.05% to 2.00%,
Mn: 1.50% to 3.00%,
Al: 0.005% to 1.500%,
P: 0% to 0.040%,
S: 0% to 0.010%,
N: 0% to 0.0100%,
O: 0% to 0.0060%,
Cr: 0% to 0.50%,
Ni: 0% to 1.00%,
Cu: 0% to 1.00%,
Mo: 0% to 0.50%,
Ti: 0% to 0.200%,
Nb: 0% to 0.200%,
V: 0% to 0.500%,
B: 0% to 0.0100%,
W: 0% to 0.1000%,
Ta: 0% to 0.1000%,
Sn: 0% to 0.0500%,
Co: 0% to 0.5000%,
Sb: 0% to 0.0500%,
As: 0% to 0.0500%,
Mg: 0% to 0.0500%,
Ca: 0% to 0.0400%,
Y: 0% to 0.0500%,
La: 0% to 0.0500%,
Ce: 0% to 0.0500%,
Zr: 0% to 0.0500%, and
a remainder: Fe and impurities,
wherein when a sheet thickness is denoted by t, a metallographic structure at a t/4-position, which is a position t/4 away from a surface, in a cross section in a sheet thickness direction includes, by volume percentage,
ferrite: 20% or greater,
bainite and martensite: 40% or greater in total, and
a remainder comprising one or more selected from residual austenite and pearlite,
when a Mn concentration is measured at a plurality of measurement points at intervals of 1 μm in a square region with a side length of t/4 centered at the t/4-position in the cross section in the sheet thickness direction, a proportion of measurement points at which the Mn concentration is 1.1 times or greater an average of the Mn concentrations at all of the plurality of measurement points is less than 10.0%,
a tensile strength is 980 MPa or greater, and
a product of the tensile strength and a total elongation is 10,500 MPa·% or greater.

* * * * *